United States Patent
Sugumar et al.

(10) Patent No.: US 8,549,231 B2
(45) Date of Patent: Oct. 1, 2013

(54) PERFORMING HIGH GRANULARITY PREFETCH FROM REMOTE MEMORY INTO A CACHE ON A DEVICE WITHOUT CHANGE IN ADDRESS

(75) Inventors: Rabin A. Sugumar, Sunnyvale, CA (US); Bjørn Dag Johnsen, Oslo (NO); Ben Sum, Cumming, GA (US)

(73) Assignee: Oracle America, Inc., Redwood City, CA (US)

( * ) Notice: Subject to any disclaimer, the term of this patent is extended or adjusted under 35 U.S.C. 154(b) by 618 days.

(21) Appl. No.: 12/684,689

(22) Filed: Jan. 8, 2010

(65) Prior Publication Data
US 2011/0173396 A1 Jul. 14, 2011

(51) Int. Cl.
*G06F 12/08* (2006.01)

(52) U.S. Cl.
USPC ..... 711/137; 711/213; 711/202; 711/E12.057

(58) Field of Classification Search
USPC .......... 711/203, 206, 141, 118, 202, 137, 711/213, E12.057
See application file for complete search history.

(56) References Cited

U.S. PATENT DOCUMENTS

| | | | |
|---|---|---|---|
| 6,557,079 B1 | 4/2003 | Mason, Jr. et al. | |
| 6,611,883 B1 * | 8/2003 | Avery | 710/22 |
| 6,718,441 B2 * | 4/2004 | Gonzales et al. | 711/137 |
| 2002/0199079 A1 * | 12/2002 | Gonzales et al. | 711/219 |
| 2004/0015622 A1 * | 1/2004 | Avery | 710/22 |
| 2005/0273571 A1 * | 12/2005 | Lyon et al. | 711/203 |
| 2009/0222453 A1 | 9/2009 | Naineni | |
| 2010/0250853 A1 * | 9/2010 | Krieger et al. | 711/206 |

* cited by examiner

*Primary Examiner* — Pierre-Michel Bataille
(74) *Attorney, Agent, or Firm* — Meyertons Hood Kivlin Kowert & Goetzel, P.C.; Jeffrey C. Hood (57) ABSTRACT

Provided is a method, which may be performed on a computer, for prefetching data over an interface. The method may include receiving a first data prefetch request for first data of a first data size stored at a first physical address corresponding to a first virtual address. The first data prefetch request may include second data specifying the first virtual address and third data specifying the first data size. The first virtual address and the first data size may define a first virtual address range. The method may also include converting the first data prefetch request into a first data retrieval request. To convert the first data prefetch request into a first data retrieval request the first virtual address specified by the second data may be translated into the first physical address. The method may further include issuing the first data retrieval request at the interface, receiving the first data at the interface and storing at least a portion of the received first data in a cache. Storing may include setting each of one or more cache tags associated with the at least a portion of the received first data to correspond to the first physical address.

20 Claims, 7 Drawing Sheets

PERFORMING HIGH GRANULARITY PREFETCH FROM REMOTE MEMORY INTO A CACHE ON A DEVICE WITHOUT CHANGE IN ADDRESS

FIELD OF THE INVENTION

The present disclosure relates generally to prefetching data and, more particularly, to a method for prefetching data from a remote memory into a cache without a change in address.

The present disclosure also relates to the broad area of networks that interconnect servers to enable interserver communication. Examples of such networks include ethernet and InfiniBand. This invention also relates to interface adapters (e.g., network adapters, storage adapters and communications bus adapters) that provide the capability for central processing units (CPUs) to access storage devices (e.g., remote memory, storage disks, solid state devices and networked devices) and prefetch data from those storage devices.

The description provided is primarily written in the context of InfiniBand—similar ideas may be applicable on other network fabrics, notably fabrics that support remote direct memory access (RDMA) operations.

DESCRIPTION OF THE RELATED ART

A cluster generally refers to a group of computers that have been linked or interconnected to operate closely together, such that in many respects they form a single computer. Large clusters may include thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally includes a plurality of compute nodes (e.g., servers) and the "interconnect" between these compute nodes. An important aspect to building large cluster systems is the interconnect. The interconnect may include a "fabric", e.g., the network that connects all of the servers together, as well as host adaptors that interface each of the computer systems (servers) to the fabric. One commonly used cluster interconnect is Ethernet. More recently, clusters have started using InfiniBand as interconnect. InfiniBand (IB) is a switched fabric communications link primarily used in high-performance computing and provides quality of service and failover features as well as scalability. An InfiniBand interconnect generally provides lower latency, higher bandwidth, and improved reliability.

On some compute nodes, when a process or thread running on a compute node wishes to initiate an RDMA network request, the process may commonly write a request in a hardware-defined format to a hardware-recognized address or location in the network adapter or in memory. The network adapter may then process the request. On an RDMA write, the network adapter may read the buffer from system memory, package the data into one or more IB packets, and send the packets over the network. However, on an RDMA read, the network adapter may send a request packet over the network to the remote node, and when the remote node responds with payload packets, the network adapter may deposit the data in the buffer specified in the RDMA read request.

In many cases, RDMA reads and writes may provide a more efficient mechanism to transfer data than sending and receiving messages. However, RDMA reads and writes may be less efficient than CPU loads and stores when moving small payloads (e.g., less than or equal to eight bytes) for at least the following three reasons. Firstly, a request command may need to be created. This may involve a series of stores from the CPU to provide information to the network adapter. Secondly, during an RDMA write, data may typically be read from system memory and during an RDMA read data may typically be written to system memory. The CPU may then have to load or store the data to system memory depending if it is RDMA read or write. Therefore, there may be an additional level of indirection and associated latency. Thirdly, the CPU may need to check for completion of the request as a separate operation; an operation that may potentially involve interrupts and loads/stores to manage completion structures. Due to the inefficiencies outlined and perhaps other additional reasons, it may be thought beneficial (e.g., thought to provide improved efficiency) to support accesses to remote memory via "normal" CPU loads and stores.

However, using CPU loads and stores to access remote memory may present other problems. For example, on large systems the latency involved in obtaining data from a remote node may typically exceed a microsecond. Such large latencies may be compared to latencies of tens of nanoseconds that modern CPUs are designed for. While CPUs may typically include features that mitigate access latency (e.g., multiple outstanding loads, hardware initiated prefetches, software initiated prefetches) these features may be insufficient to hide such high latencies (e.g., around one microsecond). Consequently, high latency accesses may greatly increase CPU wait time and may reduce CPU performance.

Current approaches to tackling this problem may include using RDMA read requests to obtain larger data blocks that may then be saved locally for future access. However, RDMA reads may result in a change in address space—i.e., the address that the CPU may use to perform a remote load or store may be different from the address that the CPU may use to access the same data following the RDMA read. Such a change in address space may constitute a significant programming problem since prefetching data may now imply using a different address space, and other software processes that access the same data may need to be made aware of the new address space, and stores may need to be communicated back to the original address space at some point.

Another well known approach that has similar problems is "vector registers." In this approach a vector load may issued to bring data from remote memory closer to the CPU. Here again there may be an address space change that may have to be coordinated in the program.

In this invention we will describe a large granularity prefetching solution from remote memory where there is no change in address space.

SUMMARY OF THE INVENTION

Provided is a method for prefetching data over an interface according to various embodiments. The method, which may be performed on a computer, may include receiving a first data prefetch request for first data of a first data size stored at a first physical address corresponding to a first virtual address. The first data prefetch request may include second data specifying the first virtual address and third data specifying the first data size. The first virtual address and the first data size may define a first virtual address range. In certain embodiments, the method may include issuing the first data prefetch request by writing the second data specifying the first virtual address to a collect buffer structure, writing the third data specifying the first data size to the collect buffer structure and activating a doorbell associated with the collect buffer structure.

The method may also include converting the first data prefetch request into a first data retrieval request. To convert the first data prefetch request into a first data retrieval request the first virtual address specified by the second data may be translated into the first physical address. In certain embodiments, translating the first virtual address specified by the second data into the first physical address may include selecting, using a context, an address translation table partition in an address translation table that includes a plurality of address translation table partitions. Translating the first virtual address specified by the second data into the first physical address may also include translating the first virtual address specified by the second data into the first physical address using the selected address translation table partition. In certain embodiments, the interface may be coupled to a network and converting the first data prefetch request into a first data retrieval request may include translating the first physical address into a first set of remote direct memory access (RDMA) parameters and creating an RDMA request for a quantity of data corresponding to the first data size using the first set of RDMA parameters. In one or more embodiments, translating the first physical address into a first set of RDMA parameters may include indexing, using the first physical address, into an address translation table comprising a plurality of sets of RDMA parameters and obtaining the first set of RDMA parameters from the indexed entry in the address translation table. In one embodiment, at least a portion of the first set of RDMA parameters may include Infiniband parameters.

The method may further include issuing the first data retrieval request at the interface, receiving the first data at the interface and storing at least a portion of the received first data in a cache. Storing at least a portion of the received first data in a cache may include setting each of one or more cache tags associated with the at least a portion of the received first data to correspond to the first physical address. In certain embodiments, storing the at least a portion of the received first data in the cache may also include dividing the at least a portion of the received first data into a plurality of sub-portions of the received first data for placing in the cache and storing at least two sub-portions of the plurality of sub-portions of the received first data in different cache lines in the cache. After dividing, the size of each sub-portion of the plurality of sub-portions of the received first data may be less than or equal to the size of a cache line of the cache.

In some embodiments, the method may also include translating a second virtual address, located within the first virtual address range, into a second physical address and receiving a request for fourth data stored at the second physical address. The method may also include determining that the cache presently holds the fourth data and providing the fourth data from the cache in response to said determining that the cache presently holds the fourth data. Determining that the cache presently holds the forth data may include determining that the second physical address matches at least one of the one or more cache tags.

According to some embodiments, the method may also include translating a third virtual address, located inside the first virtual address range, into a third physical address and receiving a request for fifth data stored at the third physical address. The method may also include determining that the cache does not presently hold the fifth data by determining that the third physical address does not match at least one of the one or more cache tags. And, the method may also include converting the request for fifth data into a second data retrieval request and issuing the second data retrieval request at the interface in response to determining that the cache does not presently hold the fifth data.

In certain embodiments, the method may also include translating a forth virtual address, located outside the first virtual address range, into a forth physical address and receiving a request for sixth data stored at the forth physical address. The method may also include determining that the cache does not presently hold the sixth data by determining that the forth physical address does not match at least one of the one or more cache tags. And, the method may also include converting the request for sixth data into a third data retrieval request and issuing the third data retrieval request at the interface in response to said determining that the cache does not presently hold the sixth data.

Provided also is a compute node interface device (CNID) according to various embodiments. The CNID may include a host interface configured to communicate with a local compute node during operation, a cache configured to store prefetched data and a second interface configured to transfer data. The CNID may be configured to receive at the host interface, a first data prefetch request from the local compute node. The first data prefetch request may be for first data of a first data size stored at a first physical address corresponding to a first virtual address. Also, the first data prefetch request may include second data specifying the first virtual address and third data specifying the first data size. The CNID may also be configured to convert the first data prefetch request into a first data retrieval request by translating the first virtual address specified by the second data into the first physical address.

In one or more embodiments, the CNID may further comprises an upstream address translation table (UATT) configured to hold virtual address translation information. To translate the first virtual address specified by the second data into the first physical address, the CNID may be further configured to translate the first virtual address specified by the second data into the first physical address using the UATT. In certain embodiments, the UATT may include a plurality of table partitions and the CNID may be configured to select a table partition in the UATT using a context that may be specified by information included the first data prefetch request. The CNID may then use information from the selected table partition to translate the first virtual address specified by the second data into the first physical address using the UATT.

In addition, the CNID may be further configured to issue the first data retrieval request at the second interface, receive the first data at the second interface and store at least a portion of the received first data in the cache. In order to store the at least a portion of the received first data in the cache, the CNID may be further configured to set each of one or more cache tags, which may be associated with the at least a portion of the received first data, to correspond to the first physical address.

In some embodiments the second interface may be a network interface and the first data retrieval request may be a RDMA request. In such embodiments, the compute node interface device may be further configured to convert the first data prefetch request into a first data retrieval request by translating the first physical address into first RDMA parameters and creating an RDMA request using the first RDMA parameters for a quantity of data corresponding to the first data size. In certain embodiments, the CNID may also include a downstream address translation table that may be configured to hold physical address translation information and, in order to translate the first physical address into first RDMA parameters, the CNID may be further configured to translate the first physical address into RDMA parameters using the downstream address translation table.

In certain embodiments, the CNID may be configured receive, at the host interface, a request for fourth data stored at a second physical address. In addition, the CNID may be configured to determine that the cache presently holds the fourth data by determining that the second physical address matches at least one of the one or more cache tags. Furthermore, the CNID may be configured to provide, at the host interface, fourth data from the cache in response to said determining that the cache presently holds the fourth data.

In one or more embodiments, the CNID may be configured receive, at the host interface, a request for fifth data stored at a third physical address. Additionally, the CNID may be configured to determine that the cache does not presently hold the fifth data by determining that the third physical address does not match at least one of the one or more cache tags. Furthermore, the CNID may be further configured to issue a data retrieval request at the second interface in response to determining that the cache does not presently hold the fifth data.

Provided also is a system according to various embodiments. The system may include a local compute node with a central processing unit (CPU) and a memory element coupled to the CPU. The memory element may store programming instructions, executable by the CPU, that cause the CPU to issue to a network adapter, a first data prefetch request for first data of a first data size stored at a first physical address corresponding to a first virtual address. The first data prefetch request may include second data specifying the first virtual address and third data specifying the first data size. In addition, the system may include a cache, comprising one or more cache tags, for storing prefetched data and a network adapter for handling data requests and coupled to the local compute node. The network adaptor may include a host interface for coupling to the local compute node and configured to receive the first data prefetch request and request conversion circuitry configured to convert the received first data prefetch request into a corresponding first network data transfer request. To convert the received first data prefetch request, the request conversion circuitry may be further configured to translate the first virtual address specified by the second data into the first physical address. Also, the system may include network interface for coupling to a network and the network interface may be configured to transmit the first network data transfer request for first data and receive the first data. Furthermore, the system may include a cache interface for coupling to the cache and the cache interface may be configured to store at least a portion of the received first data in the cache by setting at least one cache tag of the one or more cache tags to correspond to the first physical address.

In some embodiments of the system, the memory element of the compute node may store further programming instructions executable by the CPU to issue a request for fourth data stored at a second physical address and the host interface may be further configured to receive the request for fourth data. In addition, the cache interface may be further configured to determine that the cache does not presently hold the fourth data by determining that the second physical address does not match the at least one cache tag of the one or more cache tags. Furthermore, the request conversion circuitry may be further configured to convert the received request for fourth data into a second network data transfer request. Furthermore, the network interface may be further configured to transmit the second network data transfer request and receive the fourth data and the network adapter may be further configured to supply the fourth data to the compute node.

BRIEF DESCRIPTION OF THE DRAWINGS

A better understanding of embodiments of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Definitions

Compute Node—refers to a computer system having a processor (or CPU) and memory. A Compute Node may have a single processor (which may be single core or multi-core) or may have a plurality of processors. One example of a Compute Node is a blade server.

Local Node—refers to the Compute Node corresponding to a local reference. For example, the Compute Node associated with a particular CPU would be the CPU's local node.

Network Fabric—refers to a network or interconnect for connecting multiple Compute Nodes.

Compute Node Interface Device (or "Network Adaptor")—refers to an interface for coupling a Compute Node to a Network (or Network Fabric).

Remote Location—refers to a location on another machine (e.g., a Compute Node) on a network.

Figure 1:
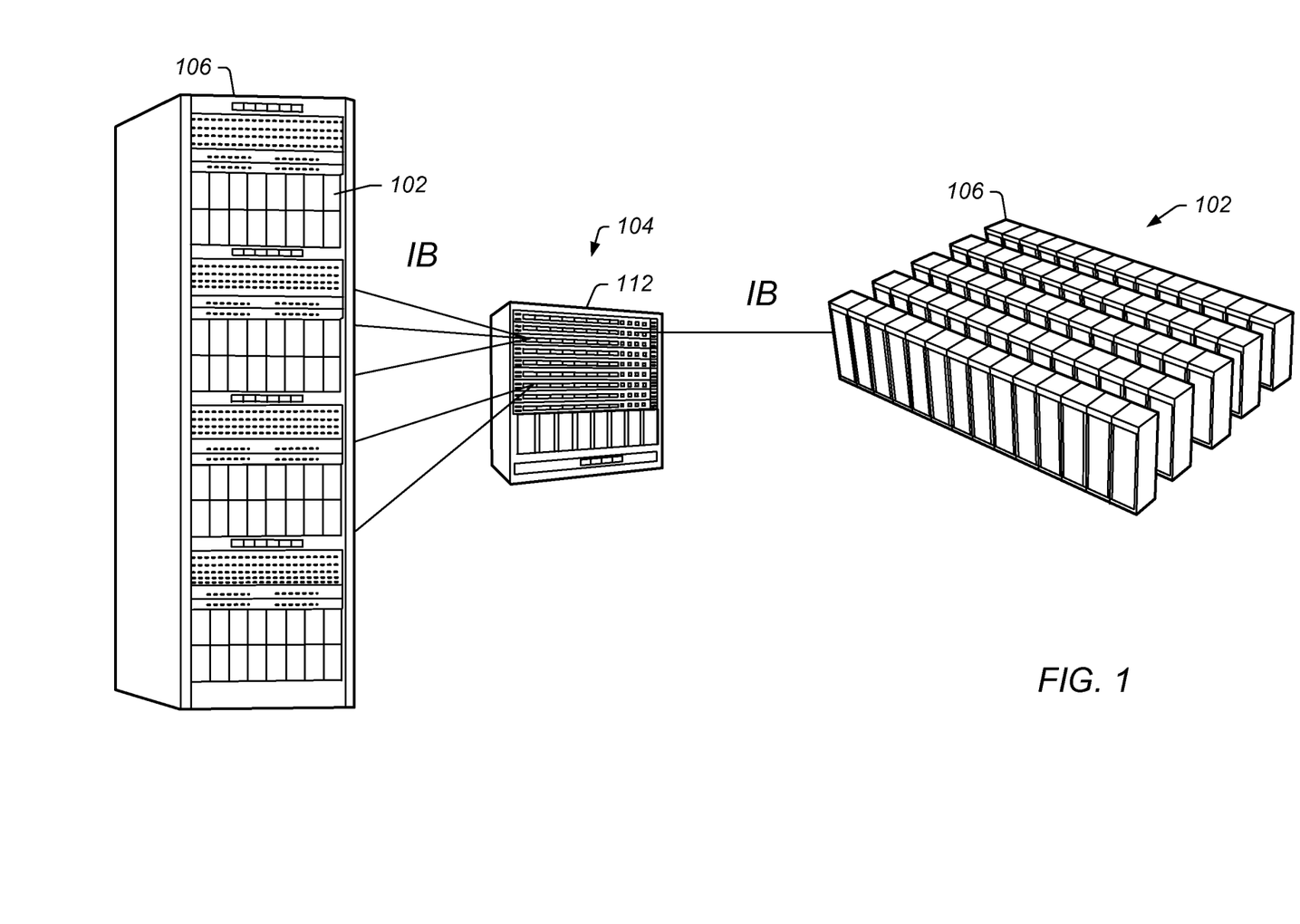
FIG. 1 illustrates an exemplary cluster according to one embodiment of the invention.

FIG. 1

FIG. 1 illustrates an exemplary cluster system according to one embodiment of the invention. As shown, the system may include a plurality of computer systems or compute nodes 102a/102b (collectively referred to as compute node 102 or compute nodes 102) that are connected together by an interconnect 104. The compute nodes 102 may take various forms. In the embodiment of FIG. 1, the compute nodes 102 may include blade servers that are housed in one or more racks 106a/106b (collectively referred to as rack 106 or racks 106). The interconnect 104 may include a fabric switch 112 as shown. The interconnect 104 may support only a single protocol, or may support a plurality of protocols. In the exemplary embodiment shown, the interconnect 104 may support the InfiniBand (IB) protocol.

In the exemplary embodiment of FIG. 1, the cluster may include one or more racks 106a each comprising four blade server chassis, which may each include a plurality of blade servers (compute nodes) 102a. The blade servers 102a may connect to the fabric switch 112 through InfiniBand. In one embodiment, the blade servers 102a connect to the fabric switch 112 over InfiniBand in all cases. As shown in FIG. 1, the fabric switch 112 may also couple to additional racks 106b having additional compute nodes 102b.

Each of the compute nodes 102 may couple to (or include) a compute node interface device, also referred to herein as a "Network Adapter" or Scalable Interface (SIF), (e.g. 110 in FIG. 2) which may provide an interface for the respective compute nodes 102. The compute node interface device or SIF 110 may couple to a respective compute node 102, and may provide an IB interface for the compute node 102 to the fabric 104, e.g., to the fabric switch 112. The compute node interface device 110 is mostly referred to herein as a "Network Adapter" for the sake of convenience.

Figure 2:
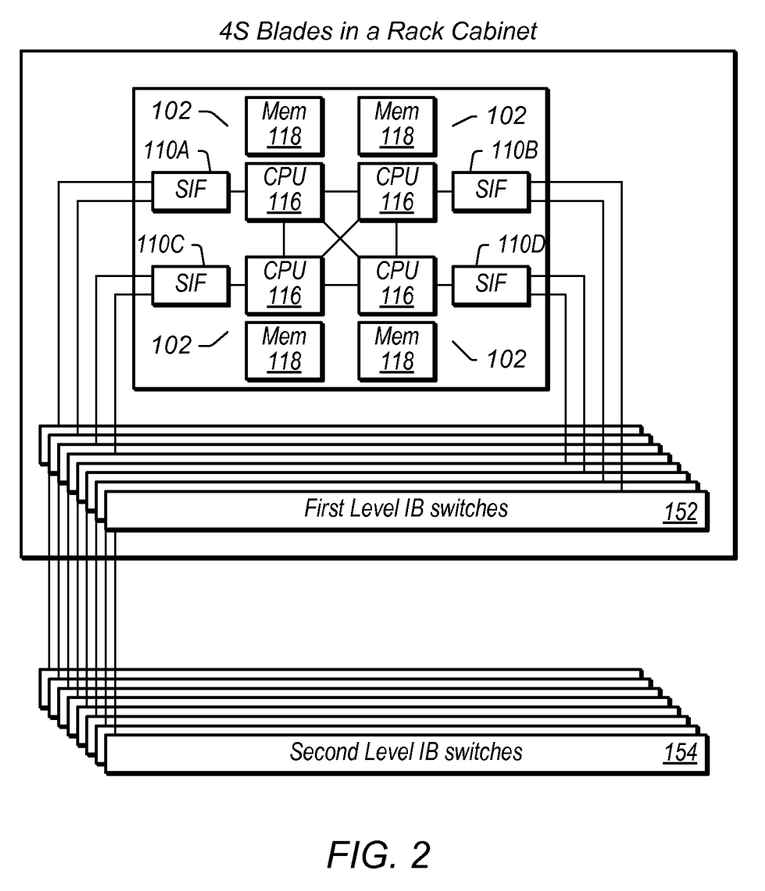
FIG. 2 is a block diagram of a portion of the cluster of FIG. 1, showing an exemplary compute node (4 server blade) connected to several levels of switches.

FIG. 2

FIG. 2 is a block diagram illustrating a portion of a cluster system comprising an exemplary server blade (compute node 102) connected to form the cluster. Each compute node 102 may include a corresponding Scalable Interface (SIF) block (e.g., a compute node interface device or network adaptor) 110 (labeled as 110A-110D). Each CPU 116 (or compute node 102) may couple to its respective Scalable Interface (SIF) 110A-D that also may be located on the blade server. The SIF blocks 110 (110A-110D) may each provide an InfiniBand interface to a respective compute node 102 (or respective CPU 116). The SIF blocks 110 (110A-110D) may each include an InfiniBand interface and a host interface that may be coupled to the host bus or processor bus of its respective compute node 102. The SIF block 110 is discussed in more detail with respect to FIG. 3.

Each of the SIF blocks 110 (110A-110D) may couple to InfiniBand switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables, as shown. There may be additional levels of IB switches.

Figure 3:
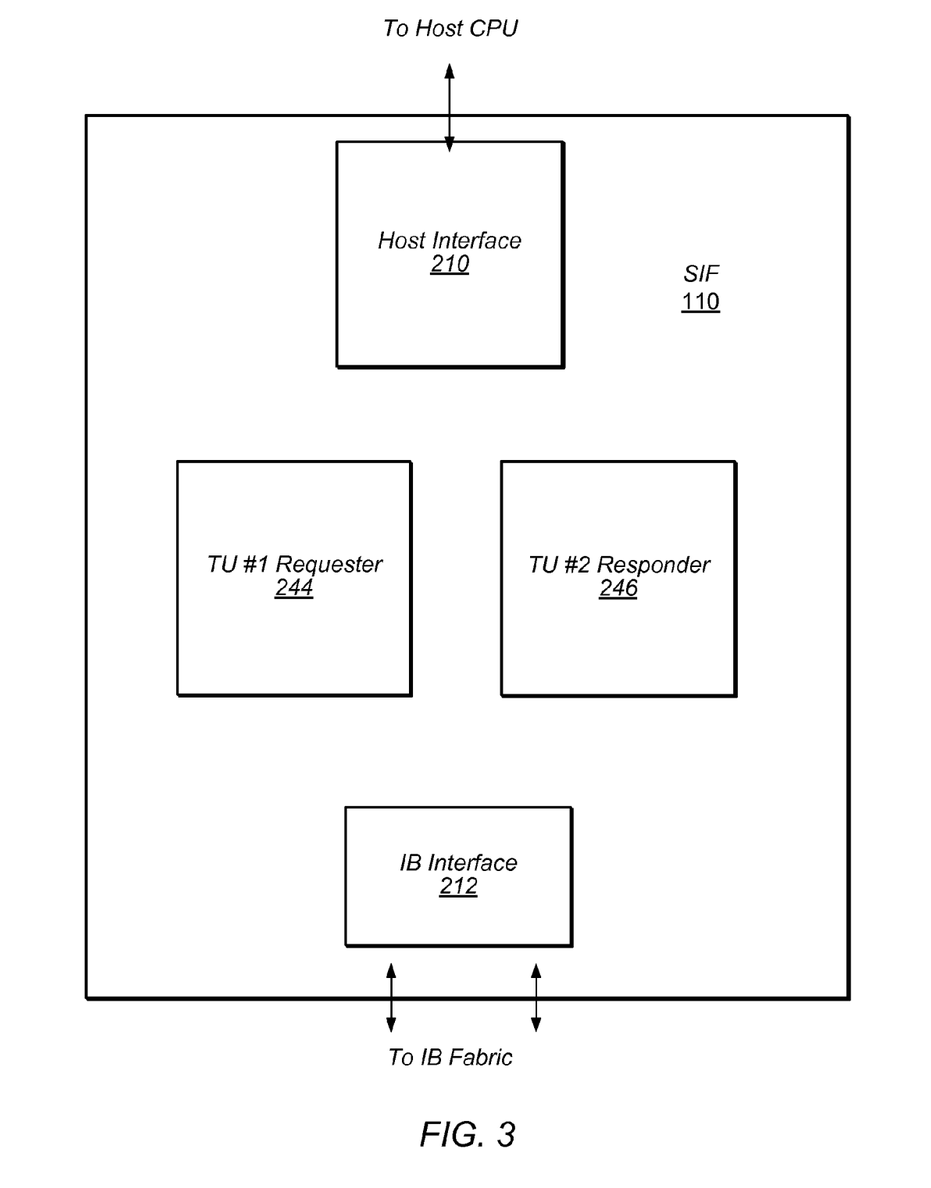
FIG. 3 is a block diagram of an exemplary scalable interface (SIF) used in interconnecting the various compute nodes in the cluster of FIG. 1.

FIG. 3

FIG. 3 is a block diagram of an exemplary Scalable Interface (SIF) block (e.g., compute node interface device or network adaptor) 110. The SIF network adapter 110 may operate as an interface or I/O adapter for each compute node 102 in the cluster. In one embodiment, the SIF 110 may not include a general purpose CPU and may not execute an operating system, and hence may have a hardware-centric structure. Such a SIF 110 may provide various services in hardware that may normally require software execution.

As shown, SIF block 110 may include a host bus interface 210 for coupling to a computer system, e.g., in blade server 102. SIF block 110 may also include a network fabric interface such as InfiniBand interface 212, for coupling to an InfiniBand fabric (e.g., for coupling to the network fabric 104).

Exemplary SIF block 110 may include a TU#1 (Transaction Unit) Requester block 244 and TU#2 Responder block 246. The TU#1 Requester block 244 may generate/process requests that may be provided to other computer systems. The TU#2 Responder block 246 may be responsible for responding to incoming packets, e.g., incoming send requests from other compute nodes 102. The TU#1 Requester block 244 and the TU#2 Responder block 246 may each couple to the host bus interface 210 and the IB interface 212.

TU#1 244 may be the Requester TU. In one embodiment, all requests sent by SIF 110 may go through one of the TUs. SIF 110 may support the InfiniBand (IB) reliable communication protocol, whereby in one implementation every request may be properly acknowledged by the receiver before the request may be completed at the sender.

TU#2 246 may be the Responder TU. All incoming requests may be directed to the Responder TU (TU#2) 246 which may process the packet, ultimately delivering the packet to off-chip or on-chip memory or to other logic The SIF 110 may also include transfer management circuitry that may manage transfers as described herein. The transfer management circuitry may be coupled to the host interface 210 and to the network interface 212. The transfer management circuitry may be located in one or more of the host interface 210, the TU#1 244 and/or the TU#2 246.

Figure 4:
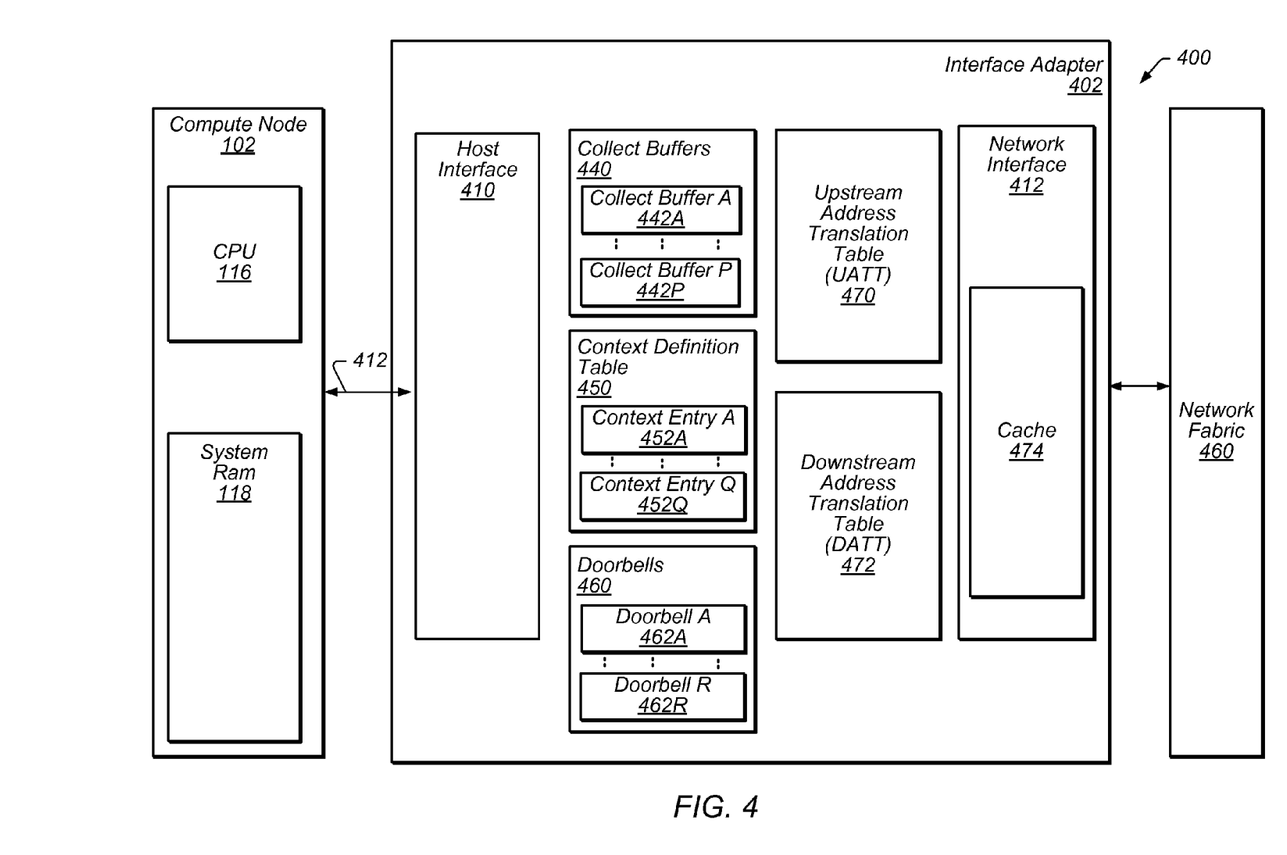
FIG. 4 is a block diagram showing a compute node coupled to a network fabric via an interface adapter.

FIG. 4

FIG. 4 depicts a system block diagram in which a high granularity prefetch from remote memory into a cache may be performed without change in address according to one or more embodiments. Depicted system 400 may include an exemplary device, e.g. interface adapter (IA) 402 that may be coupled to compute node 102. Interface adapter 402 may be a network interface adapter and it may be very similar (or perhaps identical) to SIF 110. Differences in the internal partitioning of IA 402 (as depicted in FIG. 4) and SIF device 110 (as depicted in FIG. 3) arise from a desire to provide alternative system representations that are tailored to different aspects of the adapter's functionality.

In system 400, IA 402 may be connected (e.g., via network interface 412) to a network fabric 460, which may be, for example, an InfiniBand fabric. Network interface 412, which may be very similar to or the same as IB Interface 212 on SIF 110. In addition, network interface 412 may include a cache 474 that may, for example, be used to store prefetched data. IA 402 may also connect to compute node 102 via a local communications bus 412. Communications between IA 402 and compute node 102 may be handled, on the adapter side, by host interface 410. Host interface 410 may be very similar to (or the same as) host interface 210 on SIF 110. Compute node 102 may, as depicted in FIG. 2, include a CPU 116 and system RAM (memory) 118.

Collect Buffers

IA 402 may include a set of collect buffers 440. Each collect buffer 442 (labeled as 442A-442P) may be assigned to one process (e.g., one process/application running on compute node 102). When a process wants to issue a prefetch command, instead of placing the prefetch command in a queue, and then have IA 402 read it, the process may write the command into a collect buffer (e.g., Collect Buffer N 442N), and then issue a doorbell (e.g., Doorbell B 462B) to initiate the prefetch. Each collect buffer may be large enough to hold an entire data prefetch command (e.g., that includes a virtual address and a block size) and may be sized larger to hold other command arguments and/or multiple commands.

Each collect buffer is assigned a context corresponding to the application associated with the collect buffer. In some embodiments, the assignment may be performed by privileged software (e.g., by the operating system, through an operating system call). In some embodiments, a user process (e.g. a user process that issues prefetch requests) may be restricted from specifying a context (e.g., as part of a prefetch request) in order to avoid various problems, that may include, for example, a security hazard or a security loophole.

Context Definition Table

IA 402 may also include a context definition table 450 that may hold one or more context entries 452 (labeled as 452A-452Q). A "context" (e.g., context entry) is an identifier associated with a software process (or application program) running on CPU 116 that may be defined within IA 402. A context may allow IA 402 to identify the translation table partition to be used to perform a specific address translation (e.g. the translation of a virtual address held in a collect buffer associated with the context). Each collect buffer may be assigned to a context that corresponds to the application process to which the collect buffer may be also assigned.

Doorbells

IA 402 may also include a set of doorbells 460. Each doorbell 462 (labeled as 462A-462R) may be assigned to a single process running on compute node 102. Each doorbell may correspond to a specific address and accesses to that address may be recognized by interface adapter 402 as having a special meaning. Each doorbell address (e.g., the address of doorbell "C" 462C) may be associated with a collect buffer (e.g., collect buffer "D" 442D) and a connection to a remote node (e.g. an Infiniband Queue-Pair). In some embodiments, the total number of doorbell addresses in use may be the product of the number of collect buffers and the number of active connections. Note that there may be few hardware resources associated with a doorbell—it may be just an address (e.g., a decoded address) that has special meaning. Loads or stores to these special "doorbell" addresses arriving at the adapter may cause a command (previously written to an associated collect buffer) to be initiated on the connection to which the doorbell address is assigned. In some embodiments, a doorbell address may be mapped into the address space of the process which is associated with the collect buffer corresponding to the doorbell. By controlling what doorbell addresses are mapped to a process, an operating system may control which connections a process may access. When a doorbell is accessed through a store, the data written by the doorbell may also carry command information.

Cache

IA 402 may also include cache 474 which may form part of, or which may be coupled to, network interface 412. Cache 474 may be used to hold data prefetched from remote memory, and the data may be stored in the cache using the address space (e.g., physical address space) that the CPU uses to issue the load or store.

Upstream Address Translation Table

Interface Adapter 402 may include an Upstream Address Translation Table (UATT) 470. UATT 470 may be used to translate virtual addresses used by IA 402 and CPU 116. In some embodiments, the virtual address space used by IA 402 may be the same as the virtual address space used by a process (e.g. a process running on the CPU, a process that issued a data prefetch command to IA 402). The UATT 470 may be used to perform address translations for different CPU processes each having a different virtual address space. The UATT 470 may therefore hold multiple translation table partitions and each partition may correspond to a virtual address space of a CPU process. The particular translation table partition to be used on a translation may be provided by the context (e.g., a context corresponding to Context Entry D 452D) that may form part of the data prefetch request.

Downstream Address Translation Table

Interface Adapter 402 may utilize a downstream address translation table (DATT) 472 to translate physical addresses into parameters that may be used to form network data requests (e.g., RDMA operations). The physical address may be associated, for example, with a CPU load request, with a CPU store request or with a data prefetch request. In some embodiments (e.g., where network fabric 460 is an Infini-Band fabric and IA 402 may generate RDMA transactions) the parameters may include, for example, the identity of the connection, the remote key used to validate the RDMA operation at the remote end, and the virtual address at the remote location. The DATT 472 may thus provide a mechanism to translate an address associated with a data prefetch request (or a CPU load request or a CPU store request) into a network RDMA read or write request. One embodiment of DATT 472 is depicted in FIG. 5 and described in below.

Figure 5:
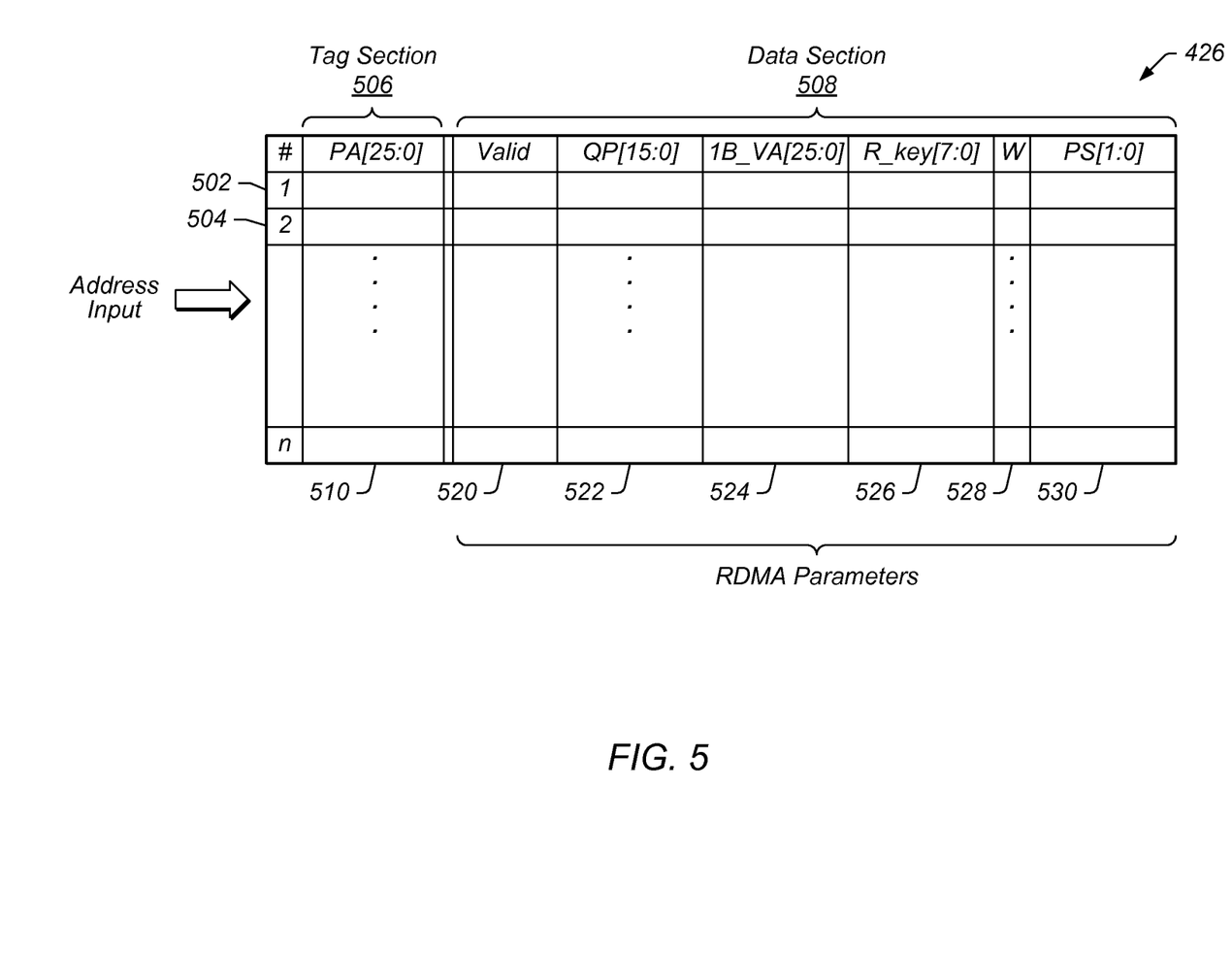
FIG. 5 depicts the structure of an exemplary downstream address translation table.

FIG. 5

FIG. 5 depicts an embodiment of a downstream address translation table (DATT) 426 that may be employed for a compute node 102 connected to an InfiniBand fabric 104. The DATT 426 may include a tag section 506 and a data section 508, and the DATT 426 may be structured so that each table entry includes a tag portion and a data portion. The DATT 426 entries are depicted as horizontal rows (e.g. 502, 504).

The tag section 506 of the DATT 426 may include a single column 510. This column 510 holds 26-bit "PA[25:0]" data values that correspond to a portion of an input address. If a pre-defined portion of an input address (e.g., physical address) presented to IA 402 on host interface 410 matches one of the PA[25:0] values held in the tag section 506, then data portion corresponding to the matched tag may be utilized for downstream address translation.

The data section 508 of the DATT 426 may be further sub-divided into individual data items. This sub-division is shown as columns 520, 522, 524, 528 and 530. Column 520 holds values for a "Valid" bit. Each Valid bit indicates if the corresponding DATT entry is valid. Column 522 holds 16-bit "QP[15:0]" data values. Each QP[15:0] segment provides an identifying value for an InfiniBand queue pair representing an InfiniBand connection. Column 524 holds "IB_VA[25:0]" data values, each of which corresponds to a portion of an address on a remote node. Column 526 holds 8-bit "R-key[7:0] values, each of which are used to validate an RDMA operation on a remote node. Column 528 holds "W" bit values, each of which indicates if a remote location is writable. Finally, Column 530 holds "PS[1:0]" data values. Each PS[1:0] value is a 2-bit code word representing a page size on the remote node, where 00 indicates 4 kB, 01 indicates 2 MB and 10 indicates 1 GB. FIG. 5 depicts one embodiment of a DATT but those skilled in the art will appreciate that many variations and configurations of DATT are possible. For example, in some embodiments the bit widths of various DATT table fields may be quite different from the widths depicted in FIG. 5, (e.g., the column 522 QP field may be 8, 12, 24 or 32-bits wide). Furthermore, in some embodiments, the coding of various DATT table fields may be quite different from the exemplary coding described, (e.g., a PS[1:0] field value of 2'b00 may indicate 8 kB, or 16 kB, 32 kB etc.) Lastly, certain embodiments may use different DATT fields and certain embodiments may include more or less DATT fields that depicted in FIG. 5.

Figure 6:
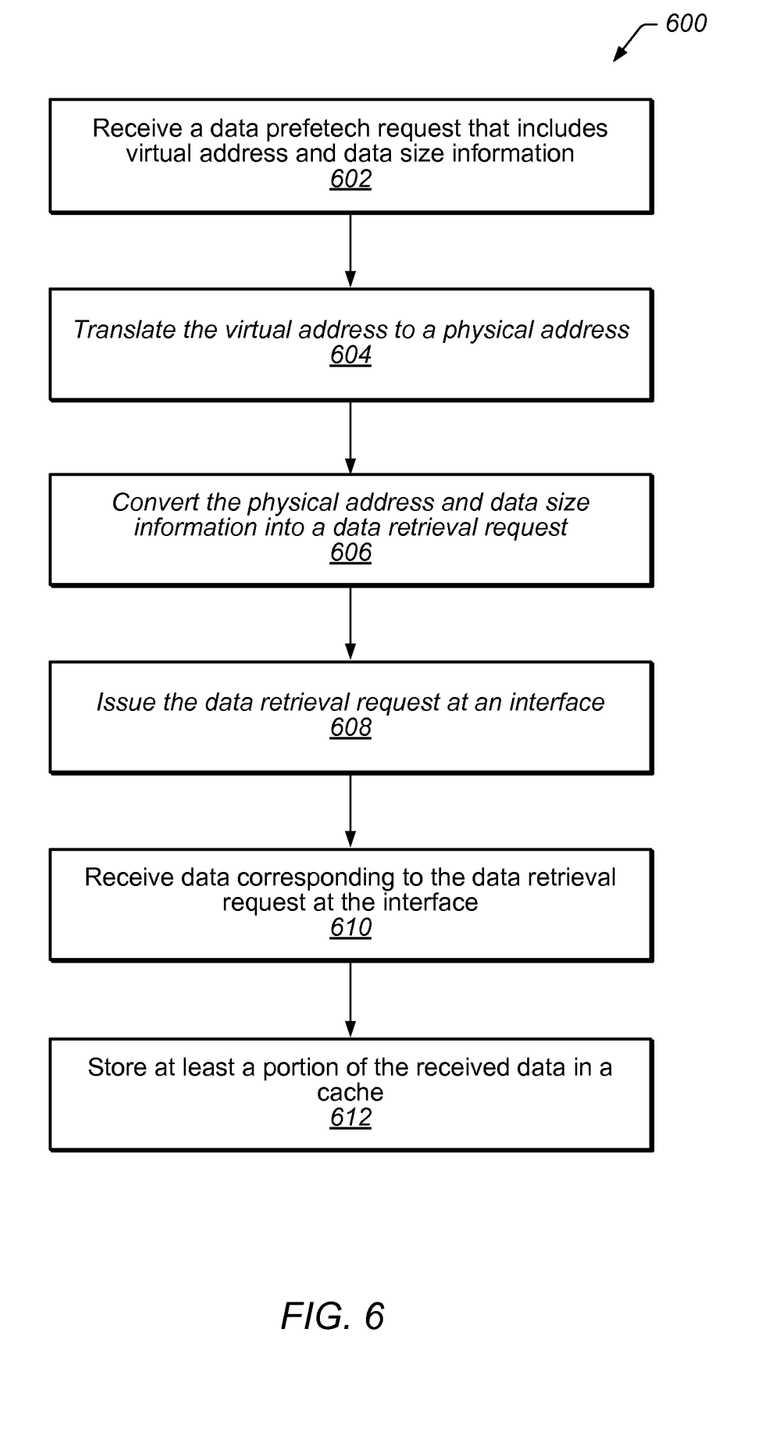
FIG. 6 depicts an exemplary method for prefetching data according to one or more embodiments.

FIG. 6

FIG. 6 is a flowchart that depicts an exemplary method 600 for performing a data prefetch from a remote memory into a cache without change in address according to one or more embodiments. The depicted method 600 may include block 602, which may involve receiving a data prefetch request that may include a virtual address and data size information. In some embodiments the prefetch request may be received at a collect buffer, which may hold a virtual address corresponding to the prefetch request and may also hold a data size (e.g., a value indicating the quantity of data requested) corresponding to the prefetch request. The collect buffer may be written by a device issuing the prefetch request (e.g., a CPU, a direct memory access controller (DMAC)). The request (e.g., the information corresponding to the request held in the collect buffer) may be received via activation of a doorbell (e.g., a doorbell associated with the collect buffer). The doorbell may be activated (e.g., by a prefetch request issuing device, by a CPU) after an associated collect buffer has been written. In some embodiments, a data prefetch request may be automatically generated from a data access. For example, circuitry may identify a data access (e.g., a CPU load transaction, a CPU store transaction, a data access being issued, a data access being received) and generate a corresponding data prefetch request. The prefetch request may be received by various functional modules or devices, for example, the prefetch request may be received by a network adapter, storage device adapters or a communications bus adapter. In some embodiments, the prefetch request may include a virtual address provided as an explicit data value (e.g., an address value written on a data bus as opposed to an address presented on an address bus). In some embodiments, the prefetch request may be an explicit request (e.g., a written request—not a bus transaction generated by a load instruction, a request corresponding to an application/process function call) and the prefetch request may not correspond to bus read transaction or a basic CPU load instruction. In some embodiments, a virtual address used by the CPU (e.g. a data prefetch virtual address, a load/store virtual address) may correspond to a physical address (e.g., the virtual address may be translated into a physical address). Consequently, a request for data at a virtual address may be referred to, or considered, as a request for data stored at a (corresponding) physical address. This alternative terminology seem more appropriate since, to obtain the data, the virtual address may first be translated in a corresponding physical address, and the physical address is used to locate the data. Those skilled in the art will appreciate however, that in some embodiments, the requested data may not be always "stored" at a physical address on the requesting system. For example, a physical address may correspond to a storage location on another networked device. Regardless of the ultimate storage location, a request for data at a virtual address may still be considered, and referred to, as a request for data stored at a (corresponding) physical address.

In some embodiments, a data prefetch request may be received in various ways. For example, data prefetch request registers (e.g., in an interface device, in an interface module) may be written. In some embodiments, a data prefetch request may be sourced (e.g., generated, issued) from the same device that "receives" the request (e.g., in a highly integrated device, in a microcontroller, in an intelligent interface adapter). In certain embodiments, receiving a data prefetch request may involve reading request information from memory. Also, in certain embodiments, at least a portion of the data size and/or virtual address may be conveyed implicitly (e.g., not explicitly written as data, may be conveyed by an attribute associated with the request) and, in certain embodiments, at least a portion of the prefetch request information (e.g. a portion of the virtual address, a portion of the data size) may be common to multiple requests and/or may be obtained from a non request-specific location. Lastly, in some embodiments, at least a portion of the information (e.g., virtual address, data size) corresponding to a data prefetch request may be coded (e.g., coded as a pointer, coded as a reference).

In the depicted embodiment, flow may proceed from block 602 to block 604, in which the virtual address corresponding to the data prefetch request may be translated into a physical address. In certain embodiments, at least a portion of the virtual address is translated into a physical address. This may be performed by identifying a physical address corresponding to a virtual address (e.g., selecting a physical address using the virtual address). The translation process may involve multiple processing stages, may involve multiple translation tables (e.g., translation tables located on Interface Adapter 402, translation tables held in System Ram 118) and may involve use of shared information (e.g., translation tables shared with CPU 116). In some embodiments, the virtual address may be translated into a physical address using a translation table (e.g., an upstream address translation table). Also, the translation from virtual address to physical address may depend on various factors (e.g., the virtual address space of an associated issuing CPU process, the context associated with the collect buffer holding the virtual address).

In the depicted flow chart 600, flow may proceed from block 604 to block 606. In some embodiments block 606 may involve converting physical address (e.g., the physical address translated from the virtual address) and data size information (both associated with the data prefetch request) into a data retrieval request. This may involve, for example, converting information corresponding to the prefetch request (e.g., the physical address and data size information) into a data retrieval request for issuing over a network (e.g., an RDMA request over an InfiniBand fabric). Alternatively, the data retrieval request may be a request to be issued to a coupled storage device of some type (e.g., hard disk storage device, solid state storage device). In some embodiments, blocks 604 and 606 may be combined, the virtual address (e.g., together with the corresponding data size information) may be translated directly into a data retrieval request and the corresponding physical address may be produced by that translation or during that translation or after that translation. The physical address and data size information may, at least according to some embodiments, be converted into a data retrieval request using a table (e.g., a downstream address translation table). The table may be used to produce, in the case of InfiniBand for example, RDMA parameters that may be used to construct the data retrieval request.

From block 606, flow may proceed to block 608 where the data retrieval request may be issued at an interface. In some embodiments, the interface may be, for example, a computer network interface (e.g., an InfiniBand interface, an Ethernet interface, a wireless network interface). Issuing the data retrieval request may involve sending the request to a targeted network device or broadcasting the request across the network. In some embodiments, the conversion to a data retrieval request (e.g., as performed in block 606) may produce parameters that may determine the type of request (e.g., a posted request, a non-posted request, an RDMA request), how the request is issued (e.g., targeted, broadcast), the target network device (e.g., target compute node, target storage device) and the location on the target network device (e.g. memory location, address space location). In some embodiments, the interface may be, for example, the interface to a storage device (e.g., a coupled storage device, a storage device on the same system, an industry standard (or custom, or proprietary) memory device (e.g., dynamic random access memory (DRAM), non-volatile random access memory (NVRAM), magneto-resistive random access memory (MRAM)). In some embodiments, issuing a data retrieval request may involve further steps (e.g., changing signal levels, changing address formats, creating specific signal timing, expanding and/or contracting signal lines) in order to achieve certain goals (e.g., to comply with a standard, to comply with a device, to match a protocol, to achieve interoperability).

In the depicted flow chart 600, flow may proceed from block 608 to block 610. In some embodiments block 610 may involve receiving data corresponding to the data retrieval request. Data may be received in various ways (e.g., in one or more data packets, in a data stream, over an extended period of time) and the received data may, for example, be wrapped, be more than the quantity requested, be less than the quantity requested, include status information, be compressed and/or be encoded. In some embodiments, data reception may involve further steps (e.g., buffering, decoding, signal level conversion, handshaking) in order to achieve certain goals (e.g., smooth flow of data, avoiding loss of data, matching received data to data retrieval requests). In certain embodiments, more data may be requested than was received while in other embodiments more data may be received than was requested.

From block 610, flow may proceed according to the depicted method 600, to block 612 where at least a portion of the received data may be stored in a cache. In some embodiments, block 612 may involve dividing the received data into blocks that may be better sized for placing in the cache (e.g., sized to fit into a cache line). Where data may be divided into chunks for placing in the cache, block 612 may involve determining one or more tag values for these chunks. In some embodiments, the tag values may be based on one or more physical addresses (e.g., one or more physical addresses based on the physical address produced by the virtual translation performed in block 604) corresponding the prefetched data block. This process of determining a tag value may involve determining an offset value (that may reflect the position of the chunk of data within the received data) and determining the tag value based on the offset value. In certain embodiments, more data may be requested (and/or received) than was stored.

Different parts of the depicted method 600 may be performed by a variety of different devices/modules. In some embodiments, one or more portions of method 600 may be performed by, for example, a network adapter, a storage device adapter, an expansion board interface, a communications bus interface or by a cache controller).

Figure 7:
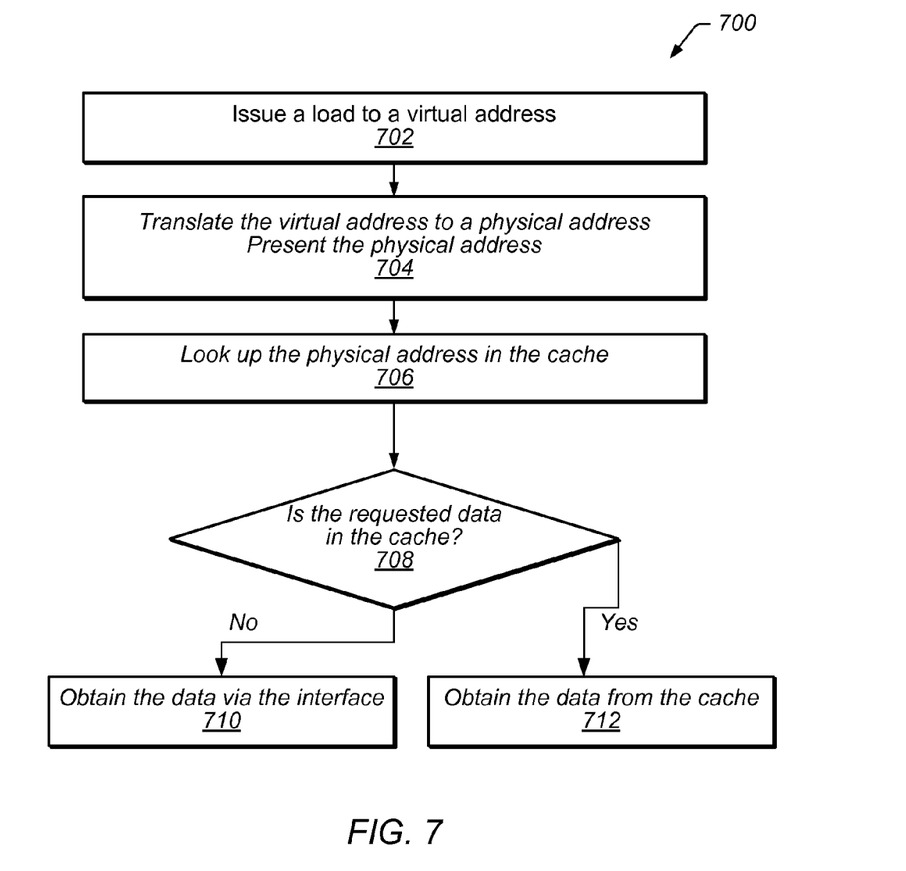
FIG. 7 depicts additional exemplary method steps according to one or more embodiments.

FIG. 7

FIG. 7 is a flow chart that depicts an exemplary method 700 for retrieving data according to some embodiments. Depicted method 700 may, for example, be performed in conjunction with data prefetch method 600. Method 700 may, for example, be performed to load data after method 600 has been used to prefetch one or more blocks of data and placed one or more chunks of data (e.g., corresponding to the one or more data blocks) in a cache.

Method 700 may start with block 702 in which a process (e.g., an application) may issue a load to virtual address. The process may be running on a compute node that is coupled to or includes an interface adapter (e.g., a network adapter, a storage adapter, a communications adapter). The process may be a different process from the process that caused data at the virtual address to be pre-fetched into the cache. The process may be privileged or non-privileged and the process may issue the load directly or use a call to issue the load.

From block 702 flow may proceed, according to exemplary method 700, to block 704 where the virtual address may be translated to a physical address. The translation may be performed by various means (e.g., by software, by circuitry, by a combination of hardware and software, by a memory management unit (MMU), by an MMU coupled to the CPU running the process that issued the load). This translation may involve identifying a physical address corresponding to the virtual address (e.g., selecting a physical address using the virtual address). If the virtual address being translated falls with the virtual address range of a previously prefetched block (e.g., a block prefetched using method 600) then the virtual to physical translation performed in block 702 may be closely related (e.g., use similar or corresponding virtual address translation information, use similar page table information, use the same page table translation information) to the virtual address translation performed in block 604 during the prefetch of the previously prefetched data block. In block 704, the physical address may be presented at the interface adapter. Presenting the physical address may involve sending the address over a bus (e.g., host bus, communications bus) connecting the physical address provider (e.g., CPU, MMU, compute node) to the interface adapter (e.g., network adapter, storage device adapter, memory device adapter). In certain embodiments, the interface adapter (e.g. and/or the cache) may be integrated with the circuitry presenting the address and there may be no clear delineation of the two circuits; still the physical address may be presented at the interface adapter (e.g., and/or the cache).

Method 700 may proceed with block 706 in which the presented physical address may be looked up in the cache. This lookup may be performed by various circuits depending on the embodiment. For example, in some embodiments (e.g., in which the cache is part of the interface adapter) the lookup may be performed by the interface adapter. In some embodiments, the lookup may be performed by circuitry coupled to the cache (e.g., the cache controller), or circuitry coupled to the cache and the interface adapter. In some embodiments, two or more of the CPU, the MMU, the cache, the interface adapter, the cache controller may be integrated as one device. The lookup may involve comparing at least a portion of the presented physical address against at least a portion of values held in one or more cache tags and determining if there is a match.

Following block 706 in exemplary flow 700 may be decision block 708, in which it may be determined if the requested data was found in the cache. In some embodiments this decision may be based on the results of the lookup of the physical address in the cache. Other factors may also be considered during this determining process (e.g., the value of cache status bits, the state of cache control logic).

According to depicted flow 700, in some cases (e.g., where the data was prefetched, stored in the cache (e.g., cache 474) and is still present in cache) the requested data may be found in cache and the "Yes" branch from block 708 to block 712 may be taken. In other cases (e.g., where data was not earlier prefetched or where data was prefetched but not stored in the cache or where data was prefetched, stored in the cache and subsequently cleared from the cache) the requested data may be not found in cache and the "No" branch from block 708 to block 710 may be taken. In block 712, the requested data may be obtained from the cache (e.g., obtained by a CPU, obtained by a process, obtained by an application). In some embodiments, the interface adapter may control the flow of data from the cache (e.g., when the cache is part of an interface adapter module or tightly coupled to an interface adapter module) to the requesting entity (e.g., to the requesting CPU, to the requesting process, to the requesting application). In some embodiments, the data may be obtained by a module, device or circuitry on behalf of the requesting entity and then supplied to the requesting entity (e.g., requested data may be obtained by a network adapter from the cache and supplied to a requesting CPU). If the "No" branch is taken at block 708, the requested data may be obtained via the interface. In some embodiments (e.g., where the interface adapter is a network interface adapter) data may be obtained by requesting data (e.g., via an RDMA request) from a remote storage device (e.g. a remote memory, a remote disk, a remote solid state device) over a network interface (e.g., an InfiniBand fabric interface, an Ethernet network interface, a wireless network interface). In other embodiments where the interface is a bus interface (e.g., a communications bus interface and/or a data transfer bus interface) data may be obtained over a bus interface (e.g., an IEEE1394 "FireWire" interface, a Universal Serial Bus (USB) interface, a serial AT/Attachment (SATA) interface). Here again, the requested data may be obtained by a module, device or circuitry (e.g. the interface adapter) on behalf of a requesting entity (e.g. a requesting CPU, a requesting process, a requesting application) and then, once obtained, supplied to the requesting entity. While the embodiment depicted in FIG. 7 has mainly been described in terms of requests originating from a CPU (e.g., from a process running on a CPU), those skilled in the art will appreciate that in some embodiments other types of devices/modules (e.g., functional blocks, custom logic, microcoded controllers, peripheral devices, data movement devices) may issue requests.

Figure 8:
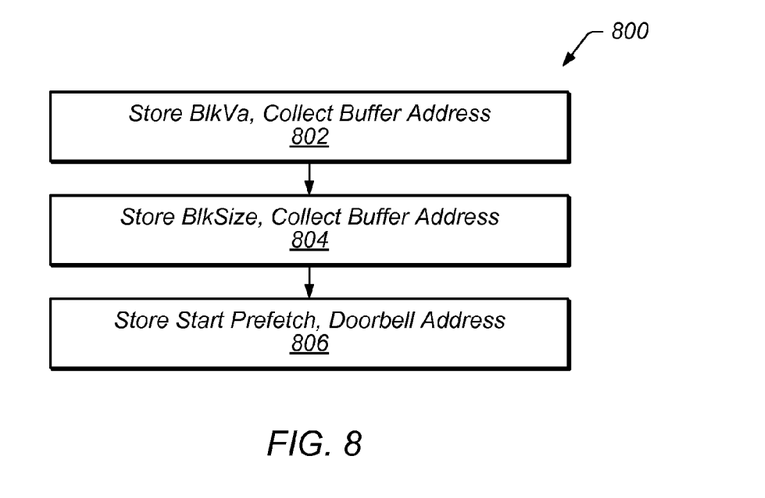
FIG. 8 illustrates exemplary steps for prefetching data using a doorbell.

FIG. 8

FIG. 8 depicts steps associated with operational example that may be performed by some embodiments. Some embodiments may be similar to embodiment 400 (depicted in FIG. 4) and may include a compute node (e.g. compute node 102) with CPU (e.g., CPU 116) running an operating system and supporting virtual memory and also supporting various processes. The compute node may be coupled to a network via a network interface adapter (e.g., interface adapter 402) and also coupled to the network may be a remote node that may include remote storage that may be accessible by a process running on the compute node (e.g., compute node 102).

The operation example may include (e.g., during the setup of an application process) the creation (e.g., in the interface adapter) of a context (e.g., context "Ctxt") that may be associated with an application process (e.g., the application process being setup). The operational example may also include providing (e.g., to the network interface adapter) pointers to an address translation table (e.g., a virtual address translation table, the address translation table associated with context Ctxt, a table located within a UATT partition) to the network interface adapter.

At some point following the steps described above, the application process may wish to access one or more locations within a data block (e.g. of size "BlkSize" bytes) stored at a remote location (e.g., at remote node "RemNode") that may be mapped to a virtual address (e.g., virtual address "BlkVA") within the application process, and that may also be mapped to a physical address (e.g., physical address "BlkPA") within the node on which the process is running (e.g., compute node 102). For a variety of reasons (e.g., to improve application performance, to conserve network bandwidth) the programmer of the application (or the compiler used to compile the application) may decide to prefetch the data block before the process wishes to access the one or more locations within data block. To prefetch the data block, programmer/compiler may use the steps 800 shown in FIG. 8. Steps 800 may include step 802 in which the requesting application may store the virtual address of the block BlkVa at a collect buffer address (e.g., a collect buffer associated with the requesting application, a collect buffer associated with a requesting process, a collect buffer associated with a context, a collect buffer associated with context Ctxt). Following step 802 may be step 804 in which block size Blksize may also be stored (e.g. written) to a collect buffer (e.g., the same collect buffer, a similar collect buffer address). After storing the block size and virtual address of the data block in the collect buffer, an access (e.g., a store of a "Start Prefetch" code, a load) to an associated (or corresponding) doorbell may be made. Here the first two stores (steps 802, 804) may provide the virtual address and size of the data block and the last store (e.g., 806) may initiate the prefetch of the data block.

On receiving the doorbell (e.g., the doorbell address being accessed, the doorbell being activated) the interface adapter (e.g., interface adapter 402) may first lookup the supplied virtual address (e.g., BlkVA) in an upstream translation table (e.g., upstream translation table 470). This lookup may be performed using the context corresponding to the process (e.g., context Ctxt), and the lookup may obtain a physical address (e.g., physical address BlkPA) that may correspond to the virtual address (e.g., virtual address BlkVA).

The interface adapter (e.g., interface adapter 402) may then lookup a downstream address translation table (e.g., DATT 472) to obtain the remote node (e.g. RemNode or connection to remote node) to which the BlkPA may be mapped and to obtain the virtual address and R-key which may be used to access the block at the remote node. The network adapter may then issue an RDMA read for the requested block at the remote node and then, when RDMA read data returns, the network adapter may place the data in the cache and may tag the data with the local physical address (BlkPA).

In some embodiments, placing the data in the cache may involve segmenting the data into smaller chunks sized to fit in cache line. Each chunk may be placed in a different location of the cache, and each may be tagged with a local physical address that includes an offset (e.g., BlkPA+offset) where the offset may be different for each chunk. Later, when the application process may issue a load for some data item in the prefetched block, the virtual address corresponding to the load may be translated (e.g., by an MMU coupled to the CPU) into a physical address (e.g., where the physical address equals BlkPA+data-offset). The physical address may be presented at the interface adapter (e.g., interface adapter 402) which may then lookup the address in the cache, and may typically find it there since it was prefetched earlier. In some cases, during the time interval between completion of the prefetch and issue of the load, the data may be evicted from the cache and so the interface adapter may not find it in the cache and thus may issue an RDMA read to obtain the requested data from the remote node.

Operational Summary of Certain Embodiments

Certain embodiments of the invention may operate in the following described manner. A process on a CPU may issue a load or store to remote memory using a virtual address (not the physical address). Direct use of a physical address from a user process may be a security hazard and may prevent the swap or relocation of pages in memory. In response to the issued load or store, an MMU coupled to the CPU may translate the process's virtual address into a physical address that may be directed to an interface adapter (e.g., a network interface). The physical address presented at the interface adapter may then be translated, for example, into network transaction parameters (e.g., InfiniBand parameters such an InfiniBand Queue-Pair, R-key, remote virtual address) and a corresponding network transaction may be completed over the network with the result returned to the CPU. Notably certain embodiments allow a process to use a virtual address for explicit data prefetch. A process wishing to prefetch data may issue a doorbell to the interface adapter. The doorbell may include the following information: the virtual address within the process's address space of the block to be prefetched, the size of the data block to be prefetched. On receiving the doorbell the interface adapter may translate the virtual address to a physical address through a lookup in an upstream address translation table. After the physical address is obtained the interface adapter may perform a lookup in a downstream address translation table to translate the physical address to obtain various network and remote storage parameters (e.g., remote node, remote address, R-key). The interface adapter may then construct and issue a corresponding RDMA read for the targeted block from memory on the remote node. After the prefetched data is received, the network interface may place the data in cache at a location indicated by the corresponding physical address.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for prefetching data over an interface, the method comprising:
receiving a first data prefetch request for first data of a first data size stored at a first physical address corresponding to a first virtual address, wherein the first data prefetch request comprises second data specifying the first virtual address and third data specifying the first data size, wherein the first virtual address and the first data size define a first virtual address range;
converting the first data prefetch request into a first data retrieval request packet, said converting comprising translating the first virtual address specified by the second data into the first physical address;
issuing the first data retrieval request packet at the interface, wherein the first data retrieval request packet includes data specifying the first physical address;
receiving the first data at the interface; and
storing at least a portion of the received first data in a cache, comprising setting each of one or more cache tags to correspond to the first physical address, wherein the one or more cache tags are associated with the at least a portion of the received first data.

2. The method of claim 1, further comprising:
translating a second virtual address into a second physical address, wherein the second virtual address is located within the first virtual address range;
receiving a request for fourth data stored at the second physical address;
determining that the cache presently holds the fourth data, comprising determining that the second physical address matches at least one of the one or more cache tags; and
providing the fourth data from the cache in response to said determining that the cache presently holds the fourth data.

3. The method of claim 1, further comprising:
translating a second virtual address into a second physical address, wherein the second virtual address is located inside the first virtual address range;
receiving a request for fourth data stored at the second physical address;
determining that the cache does not presently hold the fourth data, comprising determining that the second physical address does not match at least one of the one or more cache tags;
converting the request for fourth data into a second data retrieval request; and
issuing the second data retrieval request at the interface in response to said determining that the cache does not presently hold the fourth data.

4. The method of claim 1, further comprising:
translating a second virtual address into a second physical address, wherein the second virtual address is located outside the first virtual address range;
receiving a request for fourth data stored at the second physical address;
determining that the cache does not presently hold the fourth data, comprising determining that the second physical address does not match at least one of the one or more cache tags;
converting the request for fourth data into a second data retrieval request; and
issuing the second data retrieval request at the interface in response to said determining that the cache does not presently hold the fourth data.

5. The method of claim 1, further comprising:
issuing the first data prefetch request, wherein said issuing comprises:
writing the second data specifying the first virtual address to a collect buffer structure;
writing the third data specifying the first data size to the collect buffer structure; and activating a doorbell associated with the collect buffer structure.

6. The method of claim 1, wherein said storing the at least a portion of the received first data in the cache further comprises:
dividing the at least a portion of the received first data into a plurality of sub-portions of the received first data for placing in the cache; and
storing at least two sub-portions of the plurality of sub-portions of the received first data in different cache lines in the cache;
wherein the size of each sub-portion of the plurality of sub-portions of the received first data is less than or equal to the size of a cache line of the cache.

7. The method of claim 1,
wherein translating the first virtual address specified by the second data into the first physical address further comprises:
selecting, using a context, an address translation table partition in an address translation table comprising a plurality of address translation table partitions; and
translating the first virtual address specified by the second data into the first physical address using the address translation table partition selected.

8. The method of claim 1,
wherein the interface is coupled to a network; and
wherein said converting the first data prefetch request into a first data retrieval request packet further comprises:
translating the first physical address into a first set of remote direct memory access (RDMA) parameters; and
creating an RDMA request for a quantity of data corresponding to the first data size using the first set of RDMA parameters.

9. The method of claim 8
wherein translating the first physical address into a first set of RDMA parameters comprises:
indexing, using the first physical address, into an address translation table comprising a plurality of sets of RDMA parameters; and
obtaining the first set of RDMA parameters from the indexed entry in the address translation table.

10. The method claim 9, wherein at least a portion of the first set of RDMA parameters comprises Infiniband parameters.

11. A compute node interface device (CNID) comprising:
a host interface configured to communicate with a local compute node during operation;
a cache configured to store prefetched data; and
a second interface configured to transfer data;
wherein the CNID is configured to:
receive at the host interface, a first data prefetch request from the local compute node, wherein the first data prefetch request is for first data of a first data size stored at a first physical address corresponding to a first virtual address, wherein the first data prefetch request comprises second data specifying the first virtual address and third data specifying the first data size;
convert the first data prefetch request into a first data retrieval request packet, wherein in converting, the CNID is further configured to translate the first virtual address specified by the second data into the first physical address;
issue the first data retrieval request packet at the second interface, wherein the first data retrieval request packet includes data specifying the first physical address;
receive the first data at the second interface; and
store at least a portion of the received first data in the cache;
wherein, to store the at least a portion of the received first data in the cache, the CNID is further configured to set each of one or more cache tags to correspond to the first physical address, wherein the one or more cache tags are associated with the at least a portion of the received first data.

12. The CNID of claim 11,
wherein the second interface is a network interface;
wherein the first data retrieval request packet is an RDMA request; and
wherein, to convert the first data prefetch request into a first data retrieval request packet, the compute node interface device is further configured to:
translate the first physical address into first RDMA parameters; and
create an RDMA request using the first RDMA parameters for a quantity of data corresponding to the first data size.

13. The CNID of claim 12,
wherein the CNID further comprises a downstream address translation table configured to hold physical address translation information; and
wherein, to translate the first physical address into first RDMA parameters, the CNID is further configured to translate the first physical address into the first RDMA parameters using the downstream address translation table.

14. The CNID of claim 11, wherein the CNID is further configured to:
receive, at the host interface, a request for fourth data stored at a second physical address;
determine that the cache presently holds the fourth data, comprising determining that the second physical address matches at least one of the one or more cache tags; and
provide, at the host interface, fourth data from the cache in response to said determining that the cache presently holds the fourth data.

15. The CNID of claim 11, wherein the CNID is further configured to:
receive, at the host interface, a request for fourth data stored at a second physical address;
determine that the cache does not presently hold the fourth data, comprising determining that the second physical address does not match at least one of the one or more cache tags; and
issue a data retrieval request at the second interface in response to determining that the cache does not presently hold the fourth data.

16. The CNID of claim 11,
wherein the CNID further comprises an upstream address translation table (UATT) configured to hold virtual address translation information; and
wherein, to translate the first virtual address specified by the second data into the first physical address, the CNID is further configured to translate the first virtual address specified by the second data into the first physical address using the UATT.

17. The CNID of claim 16,
wherein, to translate the first virtual address specified by the second data into the first physical address using the UATT, the CNID is further configured to:
select, using a context, a table partition in the UATT, wherein the UATT comprises a plurality of table partitions; and
translate the first virtual address specified by the second data into the first physical address using information from the table partition selected in the UATT.

18. The CNID of claim 17, wherein the first data prefetch request further comprises information specifying the context.

19. A system comprising:
a local compute node, the local compute node comprising:
a central processing unit (CPU);
a memory element coupled to the CPU and storing programming instructions executable by the CPU to issue, to a network adapter, a first data prefetch request for first data of a first data size stored at a first physical address corresponding to a first virtual address, wherein the first data prefetch request comprises second data specifying the first virtual address and third data specifying the first data size;
a cache for storing prefetched data, wherein the cache comprises one or more cache tags; a network adapter for handling data requests and coupled to the local compute node, the network adaptor comprising:
a host interface for coupling to the local compute node and configured to receive the first data prefetch request;
request conversion circuitry configured to convert the received first data prefetch request into a corresponding first network data transfer request; wherein, to convert the received first data prefetch request, the request conversion circuitry is further configured to translate the first virtual address specified by the second data into the first physical address;
a network interface for coupling to a network and configured to:
transmit the first network data transfer request for first data; and
receive the first data; and
a cache interface for coupling to the cache and configured to store at least a portion of the received first data in the cache, wherein to store at least a portion of the received first data in the cache, the cache interface is further configured to set at least one cache tag of the one or more cache tags to correspond to the first physical address.

20. The system of claim 19,
wherein the memory element of the compute node stores further programming instructions executable by the CPU to issue a request for fourth data stored at a second physical address;
wherein the host interface is further configured to receive the request for fourth data;
wherein the cache interface is further configured to determine that the cache does not presently hold the fourth data, comprising determining that the second physical address does not match the at least one cache tag of the one or more cache tags;
wherein the request conversion circuitry is further configured to convert the received request for fourth data into a second network data transfer request;
wherein the network interface is further configured to:
transmit the second network data transfer request; and
receive the fourth data; and
wherein the network adapter is further configured to supply the fourth data to the compute node.

\* \* \* \* \*